United States Patent [19]

Shimoi

[11] 4,152,763
[45] May 1, 1979

[54] CONTROL SYSTEM FOR CENTRAL PROCESSING UNIT WITH PLURAL EXECUTION UNITS

[75] Inventor: Kenji Shimoi, Kokubunji, Japan
[73] Assignee: Hitachi, Ltd., Japan
[21] Appl. No.: 658,926
[22] Filed: Feb. 18, 1976
[30] Foreign Application Priority Data
Feb. 19, 1975 [JP] Japan ............................ 50-19722
[51] Int. Cl.$^2$ ..................... G06F 7/38; G06F 13/00
[52] U.S. Cl. ............................................. 364/200
[58] Field of Search ......................... 340/172.5; 364/200 MS File, 900 MS File

[56] References Cited
U.S. PATENT DOCUMENTS

| | | | |
|---|---|---|---|
| Re. 26,171 | 3/1967 | Falkoff | 364/200 |
| 3,611,300 | 10/1971 | Aldrich et al. | 340/172.5 |
| 3,618,045 | 11/1971 | Campbell | 364/200 |
| 3,701,976 | 10/1972 | Shively | 340/172.5 |
| 3,810,114 | 5/1974 | Yamada et al. | 340/172.5 |
| 3,833,889 | 9/1974 | Cray | 340/172.5 |
| 3,932,845 | 1/1976 | Beriot | 364/900 |

Primary Examiner—Gareth D. Shaw
Assistant Examiner—Thomas M. Heckler
Attorney, Agent, or Firm—Craig & Antonelli

[57] ABSTRACT

In a multi-processor where an execution unit is shared with a plurality of instruction control units, a control system for the multi-processor includes small-scale execution units provided corresponding to the instruction control units, each small-scale execution unit executing specific instructions which are of high frequency of use and are simplified, and a control unit for controlling the selection of the small-scale execution unit and the shared execution unit.

6 Claims, 7 Drawing Figures

CONTROL SYSTEM FOR CENTRAL PROCESSING UNIT WITH PLURAL EXECUTION UNITS

BACKGROUND OF THE INVENTION

This invention relates to a control system for a multi-processor.

In order to increase the information processing ability of an electronic computer, a multi-processor is well known.

Such a multi-processor provides a system described in the following item (1) or (2):

(1) a system in which a plurality of central processors are connected with each other; and (2) a system in which a plurality of instruction control units in a central processor share other units therein, such as a memory control unit and an execution unit.

The availability of these systems is described in the publication "A Multiple Instruction Processor with Shared Resource" by M. J. Flynn et al. Parallel Processor Systems Technologies and Applications, published by Spartan books, 1970.

The present invention relates to an improvement of a multi-processor providing the system of item (2).

In such a system, the shared execution unit executes instructions in response to indication signals from a plurality of instruction control units. Therefore, this system requires a long waiting time for execution, in case that a plurality of instruction control units produce an indication signal at the same time, to thereby reduce the information processing ability of an electronic computer.

SUMMARY OF THE INVENTION

An object of the present invention is to provide a control system for a multi-processor, which can increase remarkably the information processing ability of a multi-processor, in other words, which can execute instructions at a high speed.

In order to achieve such an object, this invention is characterized by providing at least one small-scale execution unit for executing only those types of executions which are of high frequency of use and are simplified, in addition to a shared execution unit.

The selection of these two execution units is controlled by the instruction control unit. That is, some types of instructions which have a high frequency of use and are simplified (generally, which have a short execution time), such as LOAD instructions, ADD instructions, SUBTRACT instructions, BRANCH instructions, etc. are executed by the small-scale execution unit, while other types of instructions (generally, which have a long execution time) are executed by the shared execution unit.

Other objects, features and advantages of the present invention will become more apparent from the following description taken in conjunction with the accompanying drawings.

DETAILED DESCRIPTION OF THE PRIOR ART

Figure 1:
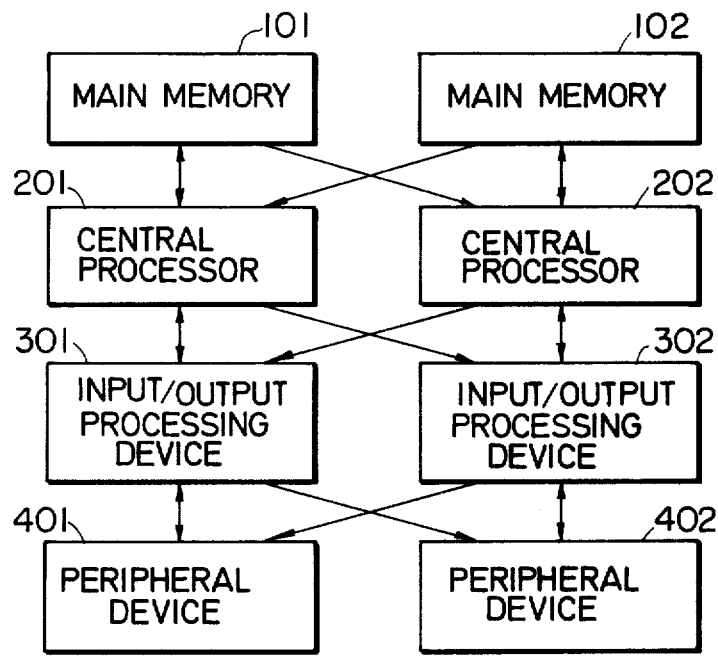
FIGS. 1 and 2 are block diagrams showing the construction of prior art multi-processors.

FIG. 1 shows the construction of a prior art multiprocessor. In FIG. 1, 101 and 102 represent main memories, 201 and 202 central processors, 301 and 302 input/output processors and 401 and 402 peripheral devices.

In FIG. 1, a multi-processor provides a first processor including main memory 101, central processor 201, input/output processor 301 and peripheral device 401 and a second processor including main memory 102, central processor 202, input/output processor 302 and peripheral device 402.

The respective devices of first and second processors are connected with each other.

Figure 2:
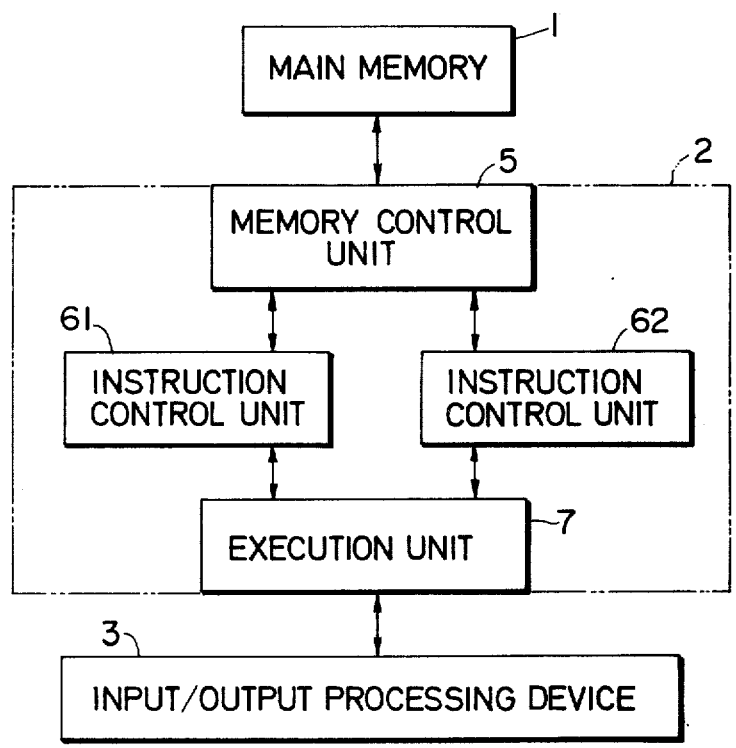

FIG. 2 shows the construction of another prior art multi-processor. In FIG. 2, 1 represents a main memory, 2 a central processor, 3 an input/output processor, 5 a memory control unit, 61 and 62 instruction control units and 7 an execution unit.

Two instruction control units 61 and 62 are provided and share the memory control unit 5 and the execution unit 7.

With such a construction, instructions from the main memory 1 are transferred through the memory control unit 5 to the instruction control units 61 and 62. An instruction from either one of the instruction control units 61 and 62 is transferred to the execution unit 7 and is then executed by the execution unit 7. Data executed thereby is transferred through the input/output processor 3 to a peripheral device (not shown in the drawing).

The present invention is particularly suited to a multi-processor shown in FIG. 2.

DETAILED DESCRIPTION OF THE INVENTION

Figure 3:
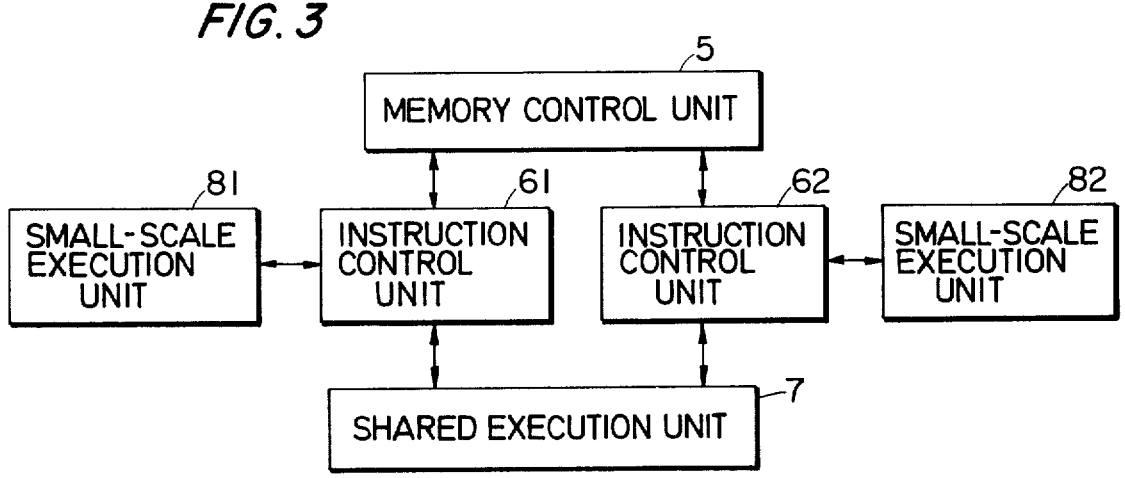
FIG. 3 is a block diagram showing the fundamental construction of a multi-processor according to the invention.

FIG. 3 shows a fundamental construction of a control system for a multi-processor according to this invention.

In FIG. 3, 81 and 82 represent small-scale execution units provided for the respective instruction control units 61 and 62. In the execution units 81 and 82, there are executed special types of instructions which have a high frequency of use and are simplified.

On the other hand, the shared execution unit 7 can execute all types of instructions. However, it executes instructions other than instructions which can be executed by the execution units 81 and 82.

Instruction control unit 61 is connected to the memory control unit 5, the shared execution unit 7 and small-scale execution unit 81, and instruction control unit 62 is connected to the memory control unit 5, the shared execution unit 7 and small-scale execution unit 82. The memory control unit 5 and the shared execution unit 7 are connected to the main memory 1 and the input/output processor 3, respectively, as shown in FIG. 2.

With such a construction, instructions to be executed next are transferred from the memory control unit 5 to the instruction control units 61 and 62. In the instruction control units 61 and 62, these instructions are decoded and it is determined whether or not they can be executed by the small-scale execution units 81 and 82.

Figure 4:
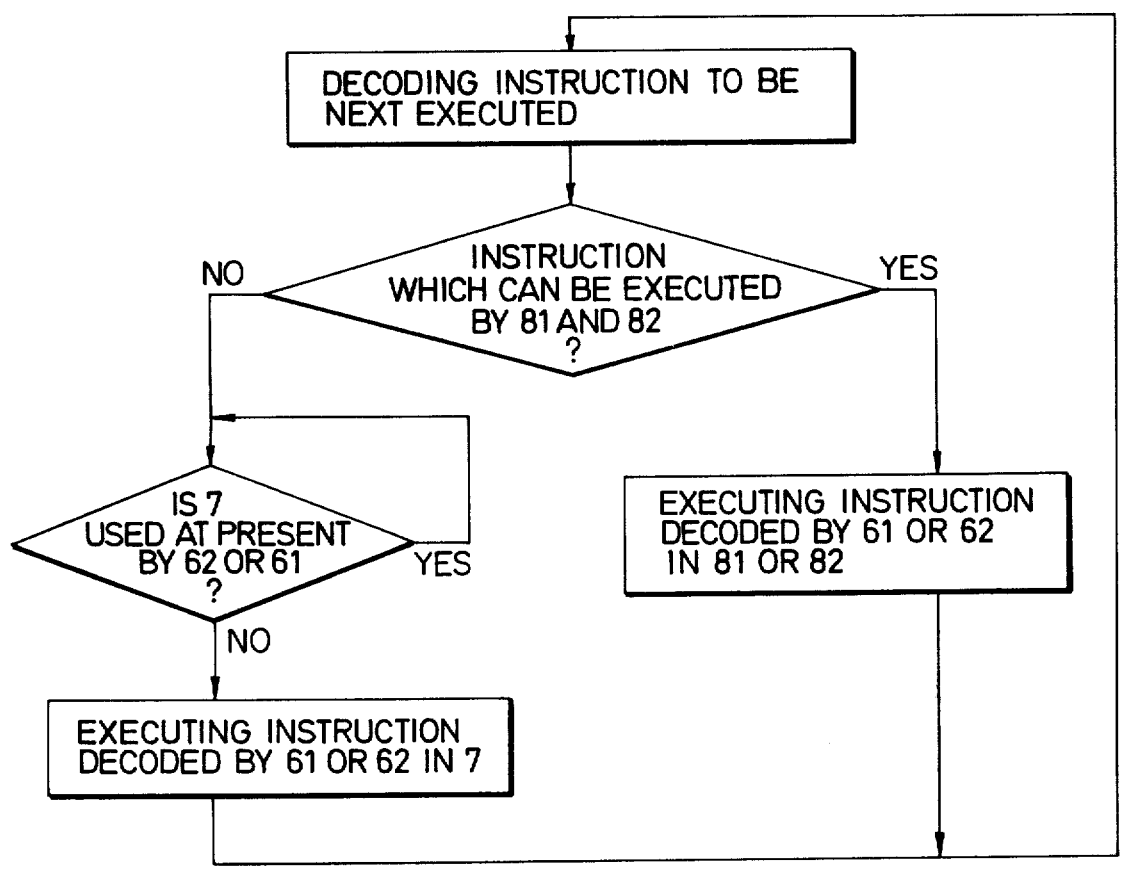
FIG. 4 is a flow diagram explaining the operation of the device shown in FIG. 3.

A flow chart of the processing steps to be carried out is shown in FIG. 4. If an instruction to be executed can be executed by the execution unit 81 or 82, this instruction is transferred from the instruction control unit 61 or 62 to the execution unit 81 or 82 and is executed by the execution unit 81 or 82. If an instruction to be executed can not be executed by the execution unit 81 or 82, the instruction control unit 61 or 62 examines the condition of use of the shared execution unit 7, that is, whether or not the shared execution unit 7 is being used at present by the instruction control unit 62 or 61. If the shared execution unit 7 is not being used at present, an instruction to be executed is transferred from the instruction control unit 61 or 62 to the shared execution unit 7 and is executed by the shared execution unit 7.

Figure 5:
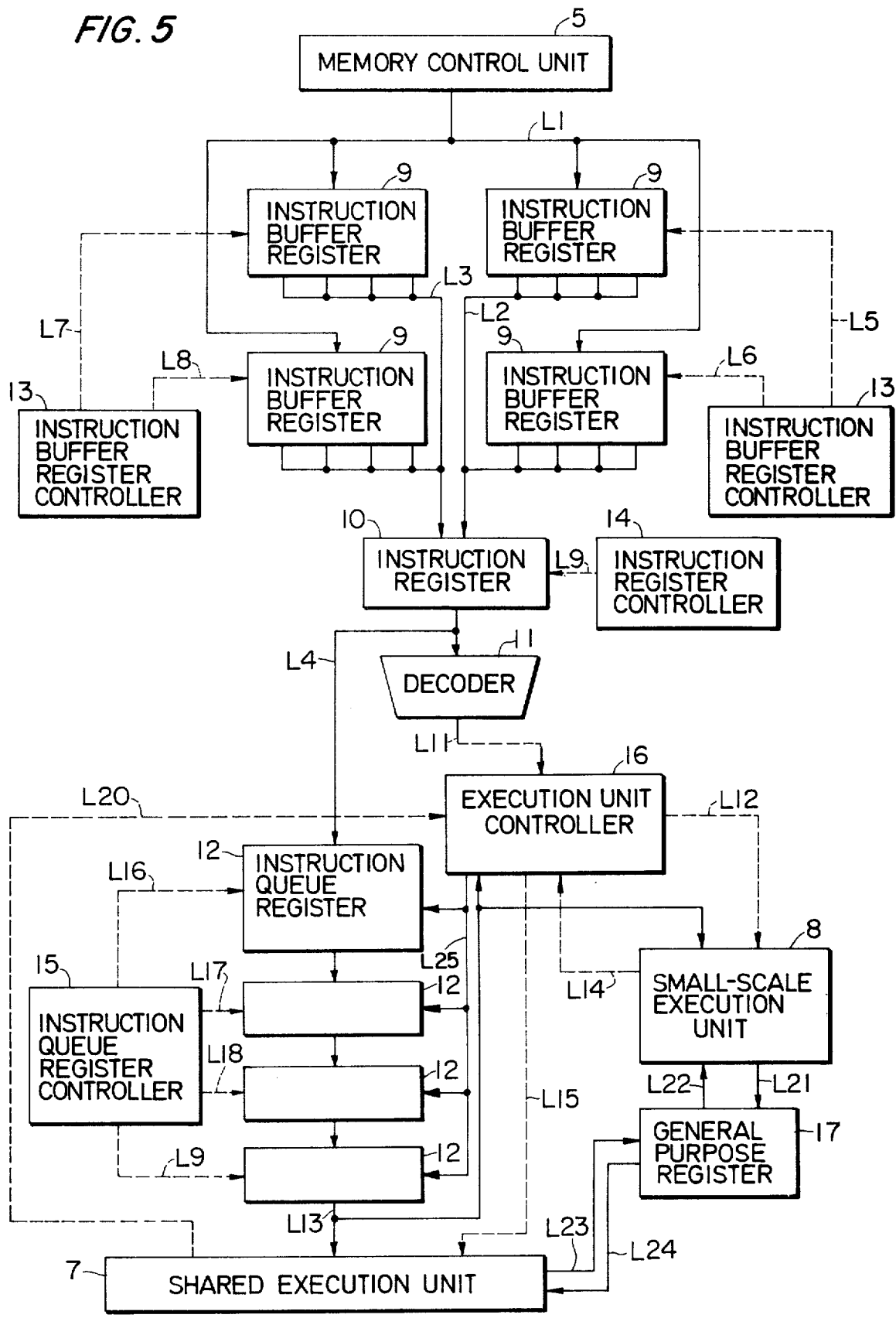
FIG. 5 is a block diagram showing an embodiment of the concrete construction of a part of the device shown in FIG. 3.

FIG. 5 shows an embodiment of a part of the system shown in FIG. 3. It shows only the memory control unit 5, the instruction control unit 61 or 62, the shared execution unit 7 and the small-scale execution unit 81 or 82. Solid lines indicate data lines and dotted lines indicate control lines.

In FIG. 5, instruction buffer registers 9 are connected to the memory control unit 5, an instruction register 10 is connected to the instruction buffer registers 9, a decoder 11 is connected to the instruction register 10, instruction queue registers 12 are connected to the instruction register 10, instruction buffer controllers 13 are connected to the instruction buffer registers 9, an instruction register controller 14 is connected to register 10, an instruction queue register controller 15 is connected to registers 12, an execution unit controller 16 is connected to the decoder 11, the shared execution unit 7 and the small-scale execution unit 8, and hardware resources 17 which is necessary for the execution of instruction, for example, general purpose registers, floating point registers, control registers, and other kinds of registers, are connected to the execution units 7 and 8. Signal lines are shown at L1 to L24.

An instruction from the memory control unit 5 is transferred through signal line L1 to either of the instruction buffer registers 9. The selection of the instruction buffer registers 9 is controlled by signal lines L5 to L8 from the instruction buffer controllers 13. An instruction stored in the instruction buffer register 9 is transferred through signal line L2 or L3 to the instruction register 10 by the control of the instruction register controller 14 and is further decoded by the decoder 11.

The decoded instruction is transferred through signal line L11 to the execution unit controller 16. In this controller 16, it is determined whether or not the instruction can be executed by the small-scale execution unit 8.

On the other hand, the instruction from the instruction register 10 is transferred through signal line L4 to either of the instruction queue registers 12. The selection of the instruction queue registers 12 is controlled by signal lines L18, L19, L16 and L17 from the instruction queue register controller 15.

An instruction stored in the instruction queue register 12 is selectively transferred through signal line L13 to the execution unit 7 or 8 by the control of controller 16.

That is, signals representing conditions of use of the execution units 7 and 8 are transferred through signal lines L20 and L14 to this controller 16. In other words, signals indicating whether or not instructions are being executed at present in the execution units 7 and 8, are transferred to the controller 16.

When an instruction on signal line L13 can be executed by execution unit 8 and this execution unit 8 is not being used at present, this instruction is transferred to the small-scale execution unit 8 in response to a starting signal on signal line L12 and is executed thereby.

On the other hand, when an instruction on signal line L13 cannot be executed by execution unit 8 and the shared execution unit 7 is not being used at present, this instruction is transferred to the shared execution unit 7 in response to a starting signal on signal line L15 and is executed thereby. When the execution units 7 and/or 8 are being used at present, the transfer of the instruction is stopped.

Signals from the execution units 7 and 8 ar transferred through signal lines L23 and L21 to general purpose register 17 and signals from general purpose register 17 are transferred through signal lines L24 and L22 to the execution units 7 and 8.

Figure 6:
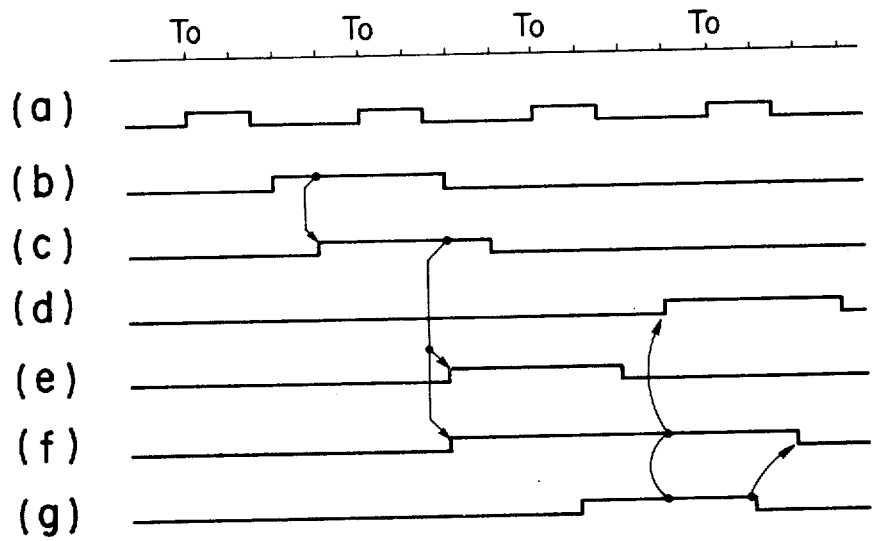
FIG. 6 is a timing diagram for explaining the operation of various parts in FIG. 5.

FIG. 6 shows a timing diagram for explaining the operation of the respective parts of FIG. 5.

In FIG. 6, (a) represents a clock signal for controlling the operation of the overall system, (b) the storage condition of the instruction buffer register 9, (c) the storage condition of the instruction register 10, (d) a starting signal on signal line L12 or L15, (e) a signal on signal line L11, (f) the storage condition of the instruction queue register 12, and (g) a signal on signal line L14 or L20.

Figure 7:
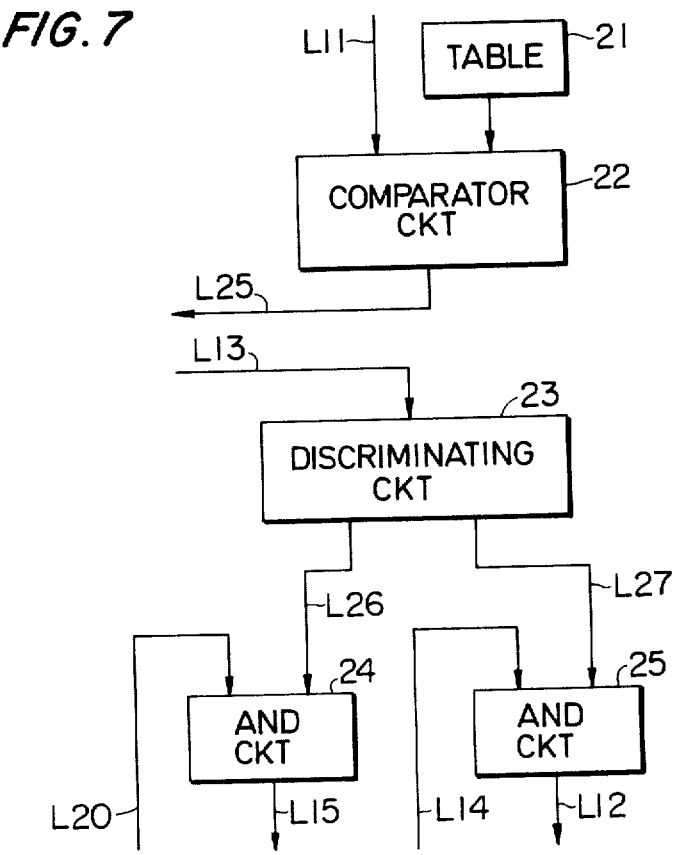
FIG. 7 is a block diagram showing an example of a part of the device shown in FIG. 5.

FIG. 7 shows an embodiment of a concrete construction of the execution unit controller 16 shown in FIG. 5.

In FIG. 7, 21 represents a table storing the types of instructions which can be executed by the small-scale execution unit 8, 22 is a comparator circuit, 23 is a discriminating circuit, 24 and 25 are AND circuits and L25 to L27 are signal lines.

An instruction on signal line L11, which is decoded by the decoder 11 shown in FIG. 5, is compared with the types of instructions stored in the table 21 by the comparator circuit 22. When the type of instruction on signal line L11 coincides with the type of instruction stored in the table 21, a "1" as a signal is transferred through signal line L25 to the instruction queue register 21 which stores an instruction then transferred from the instruction register 10 and is inserted to this instruction as a flag bit.

On the other hand, when the type of instruction on signal line L11 does not coincide with the type of instruction stored in the table 21, a "0" signal is transferred through signal line L25 to the instruction queue register 12 which stored the instruction then transferred from the instruction register 10 and is inserted into this instruction as a flag bit.

In a short, a "1" signal shows that the instruction on signal line L11 can be executed by execution unit 8 and a "0" signal shows that the instruction on signal line L11 cannot be executed by execution unit 8.

When an instruction is derived from the instruction queue register 12 to signal line L13, it is transferred to the discriminating circuit 23. This circuit 23, determines whether or not the flag bit in this instruction is a "1". When the flag bit is a "1", a signal is transferred through signal line L27 to AND circuit 25. A condition signal representing whether or not the small-scale execution unit 8 is in a condition of use is transferred through signal line L14 to AND circuit 25.

When this execution unit 8 is not being used at present, a starting signal is transferred through signal line L12 to the execution unit 8. An instruction on signal line L13 is thereby transferred to the execution unit 8 and is executed. When the execution unit 8 is being used at present, no starting signal is transferred to the execution unit 8. Therefore, the instruction on signal line L13 is not transferred.

On the other hand, when the flag bit is a "0", a signal is transferred through signal line L26 to AND circuit 24. A condition signal representing whether or not the shared execution unit 7 is in a condition of use is transferred through signal line L20 to AND circuit 24.

When this execution unit 7 is not being used at present, a starting signal is transferred through signal line L15 to the execution unit 7. An instruction on signal line L13 is thereby transferred to the execution unit 7 and is executed. When the execution unit 7 is being used at present, no starting signal is transferred to the execution unit 7. Therefore, an instruction on signal line L13 is not transferred.

Concrete constructions of the memory control unit 5, the shared execution units 7, the decoder 11, the instruction buffer register controller 13 and the instruction queue register controller 15 are not shown, since these are well known and have no connection with the operation of a control system according to this invention. The small-scale execution unit 8 can be constituted in a like manner as the shared execution unit 7, except that execution unit 8 has a constitution in which only special instructions can be executed.

As described above, it is possible to increase the information processing ability of a multi-processor by providing a small-scale execution unit which can execute instructions which have high frequency of use and are simplified. Furthermore, since the added execution unit is a small-scale unit, it can be produced at a low cost.

Although the small-scale execution units are provided corresponding to the respective instruction control units in the above-mentioned embodiment, at least one small-scale execution unit may be provided so as to be connected to at least one instruction control unit.

Furthermore, the number of the instruction control units employed may be 3 or more.

I do not wish to be limited to the details shown and described above but intend to cover all such changes and modifications as are encompassed by the scope of appended claims.

What is claimed is:

1. In a control system for a central processor having a first execution unit for executing a plurality of instructions and a plurality of instruction control units coupled to said first execution unit for controlling the transfer of instructions to said first execution unit, wherein said first execution unit is shared by said plurality of instruction control units,
   the improvement wherein
   said first execution unit executes a first group of instructions transferred from said plurality of instruction control units,
   said control system includes a plurality of second execution units, each of which is provided correspondingly and is connected to a respective one of said instruction control units and each of which executes a second group of instructions which have a higher frequency of use than said first group of instructions, and
   said each of said instruction control units includes
      first means for indicating whether an instruction under control of a respective one of said instruction control units belongs to said second group of instructions, and
      second means, responsive to said first means, for transferring an instruction to be executed, which belongs to said first group, to said first execution unit and for transferring an instruction to be executed, which belongs to said second group, to a corresponding one of said second execution units.

2. The improvement according to claim 1,
   wherein said control system comprises third means for indicating whether or not said first execution unit is being used, and
   wherein each of said instruction control units comprises
      fourth means for indicating whether or not said corresponding second execution unit is being used,
      fifth means connected to said first and third means for transferring an instruction to be executed to said first execution unit is response to said first and third means indicating that said instruction to be executed belongs to said first group and that said first execution unit is not being used, and
      sixth means, connected to said first and fourth means, for transferring an instruction to be executed to said corresponding second execution unit in response to said first and fourth means indicating that said instruction to be executed belongs to said second group and that said corresponding second execution unit is not being used.

3. The improvement according to claim 1, in which each of said instruction control units comprises
   a plurality of instruction buffer registers for storing instructions to be executed,
   an instruction register for storing an instruction from said instruction buffer registers,
   a decoder for decoding an instruction and indicating that said instruction stored in said instruction register belongs to said second group,
   a plurality of instruction queue registers for storing instructions from said instruction register, and
   a controller for controlling the transfer of an instruction from one of said instruction queue registers to only one of said first and second execution units in response to the indication by said decoder.

4. In a computer comprising a main memory for storing instructions and a central processor having a memory control unit connected to said main memory for deriving instructions to be executed from said main memory, a first execution unit for executing instructions and a plurality of instruction control units which are connected to said memory control unit and said first execution unit and which share said first execution unit,
   the improvement wherein
   said first execution unit executes a first group of instructions transferred from said plurality of instructions control units,
   said control system includes a plurality of second execution units, each of which is provided correspondingly and is connected to a respective one of said instruction control units and each of which executes a second group of instructions which have a higher frequency of use than said first group of instructions, and
   said each of said instruction control units includes first means for indicating whether an instruction under control of a respective one of said instruction control units belongs to said second group of instructions, and second means, responsive to said first means, for transferring an instruction to be executed, which belongs to said first group, to said first execution unit, and for transferring an instruction to be executed, which belongs to said second group, to a corresponding one of said second execution units.

5. The improvement according to claim 4, which further includes an input/output processor, connected to said first and second execution units to which the result of the execution operation carried out by said execution units is transferred.

6. The improvement according to claim 4, in which each one of said instruction control units comprises storing means, connected to said memory control unit, for storing an instruction to be executed transferred from said memory control unit, and controlling means, connected to said storing means and said first and second execution units, for controlling the transfer of the instruction stored in said storing means to only one of said first and second execution units in response to whether or not the instruction corresponds to the certain kinds of instructions which can be executed by said second execution unit and whether or not said first execution unit and said corresponding one of said second execution units are being used.

* * * * *